United States Patent
Artis et al.

[19]

[11] Patent Number: 5,945,942
[45] Date of Patent: Aug. 31, 1999

[54] AUTO-TEST DEVICE FOR THE TRANSMISSION AND RECEPTION SYSTEM OF A RADAR, ESPECIALLY FOR AUTOMOBILES

[75] Inventors: Jean-Paul Artis, Plouzane; Thierry Dousset, Saint Gratien; Francisco Melero, Clamart, all of France

[73] Assignee: Thomson-CSF, Paris, France

[21] Appl. No.: 09/058,198

[22] Filed: Apr. 10, 1998

[30] Foreign Application Priority Data

Apr. 18, 1997 [FR] France ................................. 97 04830

[51] Int. Cl.⁶ ........................................................ G01S 7/40
[52] U.S. Cl. .................................................... 342/165
[58] Field of Search ..................... 342/165, 166, 342/167, 168, 169, 170, 171, 172, 173, 174, 125, 128, 6

[56] References Cited

U.S. PATENT DOCUMENTS

| | | |
|---|---|---|
| 3,935,573 | 1/1976 | Johnson . |
| 4,203,113 | 5/1980 | Baghdady . |
| 4,656,481 | 4/1987 | Mawhinney ............................ 342/171 |
| 5,841,392 | 11/1998 | Kishimoto .................................... 342/6 |

FOREIGN PATENT DOCUMENTS

WO 95/04943  2/1995  WIPO .

OTHER PUBLICATIONS

Patent Abstract of Japan, vol. 18, No. 189, (P–1721), Mar. 31, 1994 and JP 06 003171 A, Jan. 11, 1994.
Patent Abstract of Japan, vol. 97, No. 8, Aug. 29, 1997 and JP 09 101145 A, Apr. 15, 1997.

Primary Examiner—Daniel T. Pihulic
Attorney, Agent, or Firm—Oblon, Spivak, McClelland, Maier & Neustadt, P.C.

[57] ABSTRACT

An auto-test device for a radar includes at least one transducer located in the field of radiation of the radar microwave transmission, the transducer being configured to intersect a part of the radiated energy and to send it back to a receiver so as to create, in the receiver, a test signal modulated by beats of the transducer. The device further includes a synchronism mechanism configured to excite the transducer in synchronism with a sub-multiple of the frequency of sampling of a reception signal. The transducer is placed such that the receiver receives a test signal with a mean value close to zero.

14 Claims, 3 Drawing Sheets

AUTO-TEST DEVICE FOR THE TRANSMISSION AND RECEPTION SYSTEM OF A RADAR, ESPECIALLY FOR AUTOMOBILES

BACKGROUND OF THE INVENTION

The present invention relates to an auto-test device to test the transmission and reception system of a radar. It can be applied especially to radars fitted into automobiles; More generally, it can be applied to radars that need to be produced at low cost.

Several types of radars can be fitted into automobiles. Among these are the known radars of the ACC or Automobile Cruise Control type. A radar of this type is designed to enable the cruising speed of automobiles to be regulated. It detects and locates the closest vehicle located in the path of the carrier vehicle. The information transmitted to the computer of the carrier vehicle makes it possible for example for the computer to take action, through appropriate interfaces, on the control system of the engine so as to regulate the distance between the carrier vehicle and its predecessor. In this case, the driver no longer has to activate the longitudinal controls such as the accelerator, the brakes or the gears. Given the vital importance of managing these controls, an analysis of the overall operational safety of the system shows that it is indispensable to have an efficient auto-test function to quickly detect any variation in the characteristics of the radar.

A speed regulation radar for automobiles may for example work by transmission with frequency shift-keying. The radar then transmits a sequence of pulses at difference frequencies. The exploitation of the resultant phases enables the distance D to be computed according to the following relationship in an exemplary use of two frequencies:

$$D = \frac{c \cdot \Delta \varphi}{4\pi \cdot \Delta F} \quad (1)$$

where c, $\Delta F$, $\Delta \varphi$, respectively represent the velocity of light, the difference in frequency of the waves transmitted and the phase difference of the signals received from one and the same target in relation to each frequency.

In practice, it is possible to use a larger number of frequencies. The computation of the distance is then for example derived from a linear combination of the elementary computations according to the above relationship (1). It can be seen in these cases that the measurement of the distance is inversely proportional to the difference in frequency between two transmitted waves. In the present state of W band microwave technology, i.e. pertaining to the 76 GHz–77 Ghz band, this difference is a variable that is difficult to control. Checking the radar during operation is therefore indispensable in view of the vital importance of the reliability of the information influencing the control of the speed of an automobile.

The methods for carrying out auto-tests on radars generally use circuits for the measurement of the characteristics of microwave transmission and circuits for the injection of calibrated signals into the reception channel. These circuits require microwave functions which, especially in the W band, are costly, difficult to implement and liable, by their presence, to induce a significant lowering of the performance characteristics of the main function. These auto-test methods are therefore not compatible with equipment that has to be produced in large batches and at low cost.

SUMMARY OF THE INVENTION

The invention is aimed at mitigating these drawbacks, and especially at obtaining an auto-test whose cost of implementation is low.

To this end, an object of the invention is an auto-test device for a radar, comprising at least one transducer inserted in the field of radiation of the microwave transmission that intersects a part of the radiated energy and sends it back to the receiver so as to create, after demodulation, a test signal whose characteristics reflect the motions of the transducer.

The main advantages of the invention are that it is compact, can be adapted particularly well to radars for automobiles as well as to all types of continuous-wave transmission radars, does not significantly disturb the performance characteristics of the main functions of the radar, is suitable for large-scale production and is simple to implement.

BRIEF DESCRIPTION OF THE DRAWINGS

Other features and advantages of the invention shall appear from the following description, made with reference to the appended drawings, of which.

MORE DETAILED DESCRIPTION

Figure 1:
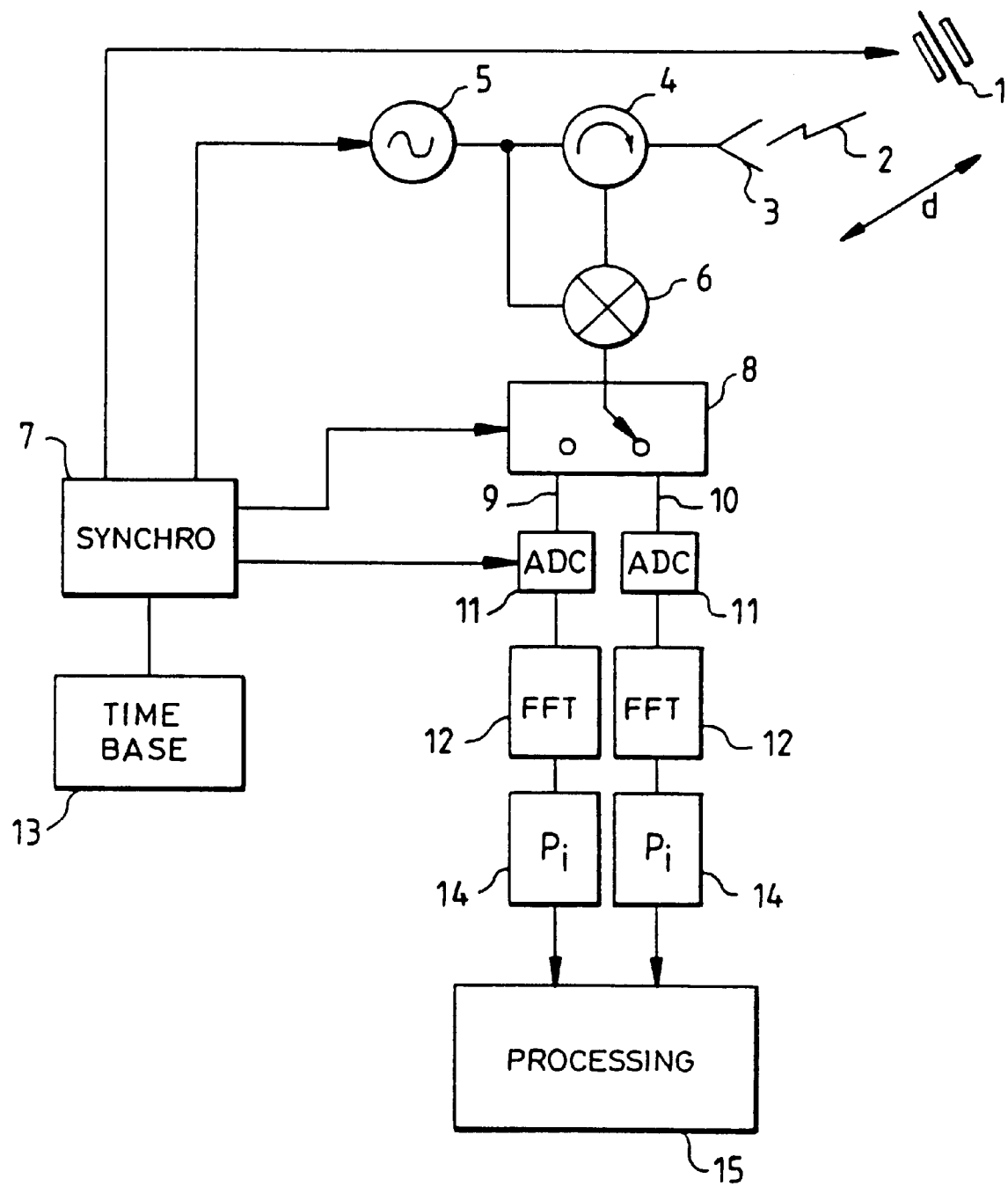
FIG. 1 is a block diagram of a possible embodiment of a device according to the invention.

FIG. 1 shows a block diagram of a possible embodiment of a device according to the invention. Since the radar is for example a monopulse radar, only the sum channel is shown in order to explain the device. This device has a transducer 1. This transducer 1 has a metal surface and is inserted in the field of radiation of the microwave transmission 2 in such a way that its surface intersects a part of the energy radiated by the transmission and sends it on to the reception part of the radar. The type of transducer used especially has an operating frequency suited to the application of the invention. It is for example an electroacoustic transducer. This transducer is, for example, of the piezoelectrical or electromagnetic type.

According to FIG. 1, the microwave transmission 2 is for example radiated by a source 3, for example the horn of an antenna. At transmission, a microwave oscillator 5 gives the transmission signal, through a circulator 4 and amplification means (not shown), to the transmission source 3. Since the microwave oscillator 5 acts for example as a local oscillator for reception in the case of the use of a homodyne type receiver, its output is also connected to a first input of a microwave mixer 6. The other input of this mixer 6 receives, from the circulator 4, the reception signals that come from the antenna 3.

Figure 2:
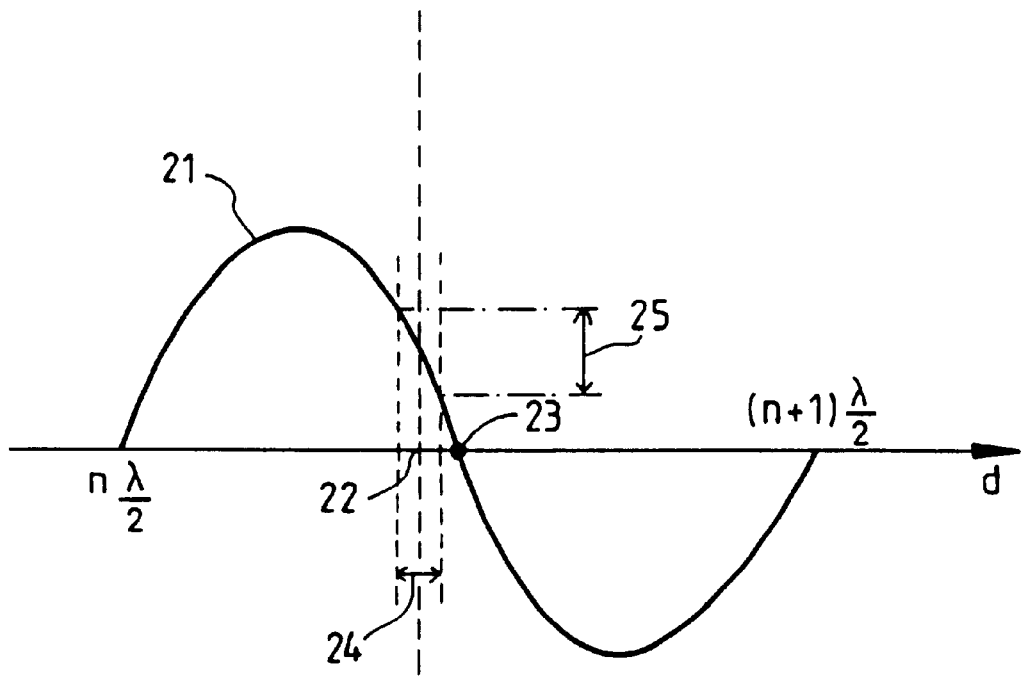
FIG. 2 illustrates the generation of an auto-test signal produced according to the invention.

FIG. 2 shows the shape of a signal generated in the mixer 6 of a receiver. This signal results from the beats of the transducer 1. The combination, in the mixer 6, of the wave reflected by the transducer 1 and the wave coming from the microwave oscillator 5 results in a signal modulated by the beats of the transducer. According to the invention, this modulated signal is used as a test signal. These beats are actually the mechanical shifts of the metal surface of the transducer on which the transmitted wave is reflected. FIG. 2 shows a sine curve 21 representing the amplitude of the signal at output of the mixer 6, as a function of changes in the distance d between the transducer 1 and the antenna 3. The sine curve 21 is given for a distance d ranging from $n\lambda/2$ to $(n+1)\lambda/2$, n being a positive integer. The position of the transducer 1 is, for example, determined so that the positions 22 of the receivers of the sum and difference channels are close for a point of cancellation or zero point 23 of the amplitude of the signals represented by the above-mentioned curve 21. This corresponds to the fact that each receiver gives a test signal whose mean value is close to zero. Indeed, the mechanical shifting 24 of the metal surface of the transducer 1 produces the above-mentioned test signal 25 at the receiver. This signal is the replica of the shift 24. For a given shift, the amplitude of the generated test signal 25 is all the greater as the receiver is close to a point of cancellation or zero point 23 for it is here that the slope of the curve 21 is at its greatest steepness. The distance d between the transducer 1 and the antenna 3 of the radar must be close to $\lambda/8$, modulus $\lambda/4$, so that the test signal has a mean value close to zero, $\lambda$ being the wavelength of the microwave signal.

It is assumed that the other routes travelled by the microwaves within the radar are equal, modulo $\lambda/4$, i.e. firstly, the routes travelled between firstly the oscillator 5 and the antenna 3 and then the antenna 3 and the mixer 6 and secondly the routes travelled between the oscillator 5 and the mixer 6.

If this is not so, it is necessary for example to modify the position of the transducer by a quantity equal to the difference of the between the routes travelled modulo $\lambda/4$ to recover the conditions described here above.

The transducer 1 is for example connected to synchronization means 7 which furthermore control the sampling of the received signals. Since the transmission is for example a frequency shift-keying transmission, the synchronization means 7 control the changes in frequencies of the microwave oscillator 5. They also control means 8 to switch the signal received from one reception channel 9 to the other reception channel 10. Each reception channel is assigned a transmission frequency, i.e. a channel is opened only when its associated frequency is transmitted. The synchronization means 7 for example also control analog-digital converters 11 placed at the input of each channel 9, 10. These analog-digital converters 11 perform for example both the digital conversion of the signals received and their sampling. The analog-digital converters 11 provide for example the sampled and digitized signals to fast Fourier transform means 12.

The transducer 1 is excited by the circuits of the radar in synchronism with a sub-multiple of the sampling frequency of the reception channel. More specially, if Fe represents the sampling frequency of a reception signal, if N represents the number of points of analysis of the signal by fast Fourier transform 12 and if Ft represents the frequency of excitation of the transducer, the latter is given by the following relationship:

$$Ft = n \cdot Fe/N \quad (2)$$

n being an integer smaller than or equal to N chosen for example as a function of technological considerations including especially the frequency of the transducer itself. The gain and phase components of the test signal 25 generated then depend only on the constitution of the circuit, i.e. especially the transducer, on the excitation circuit and on the position of the transducer, and are constant unlike the signal coming from a target where, for example, the modulus varies little and the phase is continuously variable or noise where the modulus and the phase are variable. After processing by fast Fourier transform for example, an average of the testing signals is taken on a given number of recurrences of radar transmission. The results become independent of the external environment, i.e. in particular, independent of the presence of targets or clutter for example. This operation to compute the average actually corresponds to a post-integration of the signal. There is therefore a modulation of the detected test signal. The frequency and hence the spectral position of this signal obtained by fast Fourier transform analysis are perfectly known and independent of the external environment. A specific processing of the Doppler line obtained is used to specify the different parameters proper to the transmission/reception system of the radar, these parameters relating for example to the systems for the measurement of angular location or the measurement of distance. The transducer is excited at the frequency Ft defined by the relationship (2) so as to modulate the test signal with a known sequence that is synchronous with the recurrence of analysis of a reception signal. Then the received signal is demodulated with respect to this sequence and an average is taken on a given number of recurrences.

FIG. 1 shows that the synchronization means 7 are connected for example to a reference time base 13. They control the excitation of the transducer 1 in a sub-multiple of the frequency at which they control the analog-digital converters 11 for the sampling of the signals. The outputs of the fast Fourier transform computation means 12 are for example connected to post-integration means 14 which in particular take an average of the signals detected on a given number of recurrences of radar analysis, this number being preferably high. These means 14 give their result for example to the radar processing means 15 which could analyze the test signals and thus determine certain parameters to carry out an auto-test of the transmission and reception system of the radar.

The following possible tests are given by way of an example and are not exhaustive. They are for example carried out through test signals or with data obtained after processing by the post-integration means 14. A test of the mean value of the modulus of the signal present in a selected Doppler compartment may be made. Since the test signal is proportional to the power transmitted and to the known gain of reception, the test makes it possible to conclude whether, at a given transmitted amplitude, the transmission and reception system is working or not. Another possible test may relate to the verification of the divergence between two frequencies, especially when this difference is used to measure a distance according to the above relationship (1) for example. For this test, the knowledge of the distance from the receiver to the transducer 1 is used. This distance is very small as compared with the distances of the targets measured. It is for example or the order of some centimeters. The test measures the distance from the transducer to the receiver. To obtain high precision, the distance is computed from the mean values on a large number of samples of the signals received on each frequency channel. The frequency divergence is deduced from the computation by knowledge of the distance D from the transducer to the receiver, the other components of the relationship (1) being furthermore known and constant. With regard to the phase shift $\Delta\phi$ which represents the phase shift between two test signals received in relation to each frequency, this variable is also constant as was observed earlier.

Figure 3:
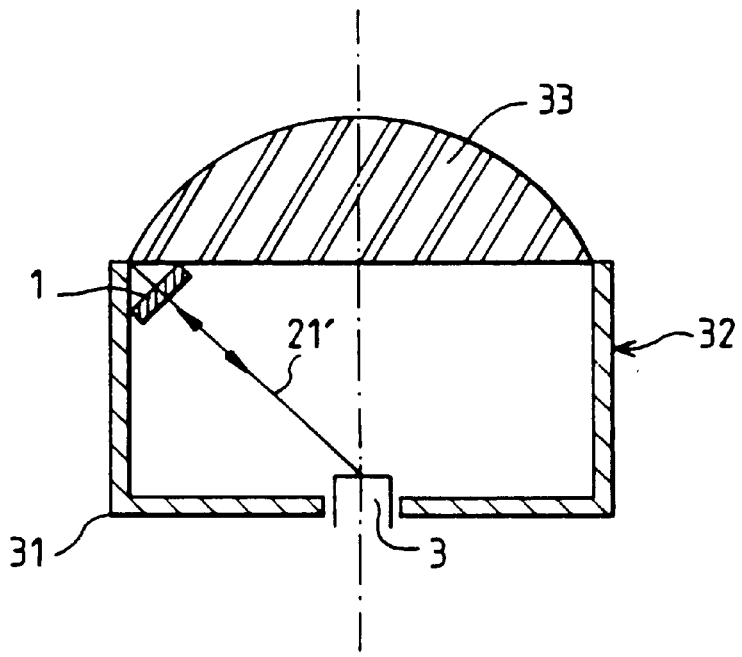
FIGS. 3, 4, and 5 exemplify the positioning of a transducer used in a device according to the invention.

FIG. 3 shows an exemplary positioning of the transducer 1 in the field of radiation of the radar. The transducer is placed in the antenna 31 of the radar. This radar has a transmission source or horn 3. Since the transmission source 3 is at the entry to a metal cylinder 32 that is open for example on the side opposite to a lens 33, the transducer is for example placed as close as possible to the inner sheathing of the cylinder 32 so as not to substantially disturb the radiation of the antenna but also so that the distance 21' between the transducer 1 and the source 3 is close to λ/8, modulo λ/4, assuming that the other routes travelled by the microwaves within the radar are equal, modulo λ/4, and if this is not the case, the position of the transducer is for example modified by a quantity equal to the difference of the routes travelled, to recover the same conditions. An approach according to FIG. 3 has the advantage especially of being highly compact and therefore of taking up little space.

Figure 4:
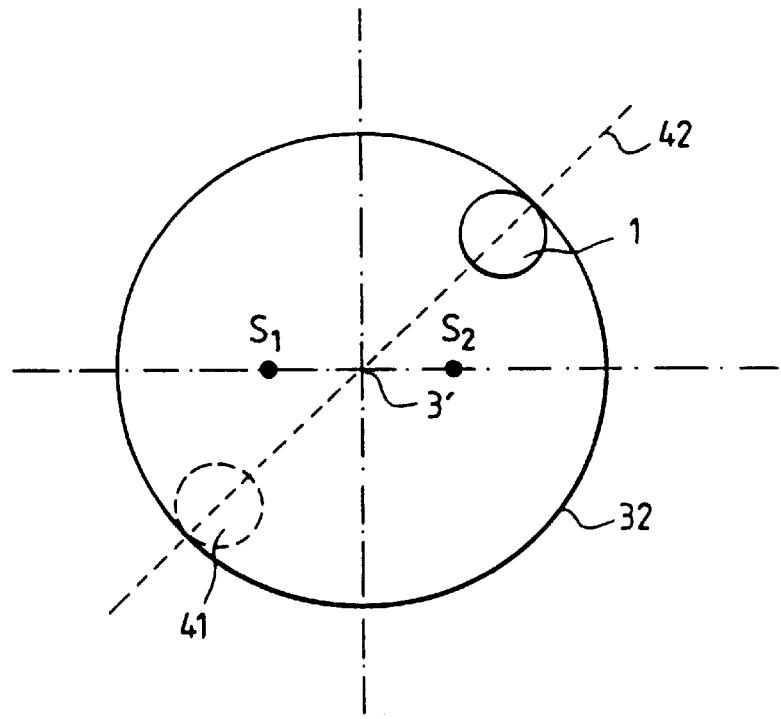
Figure 5:
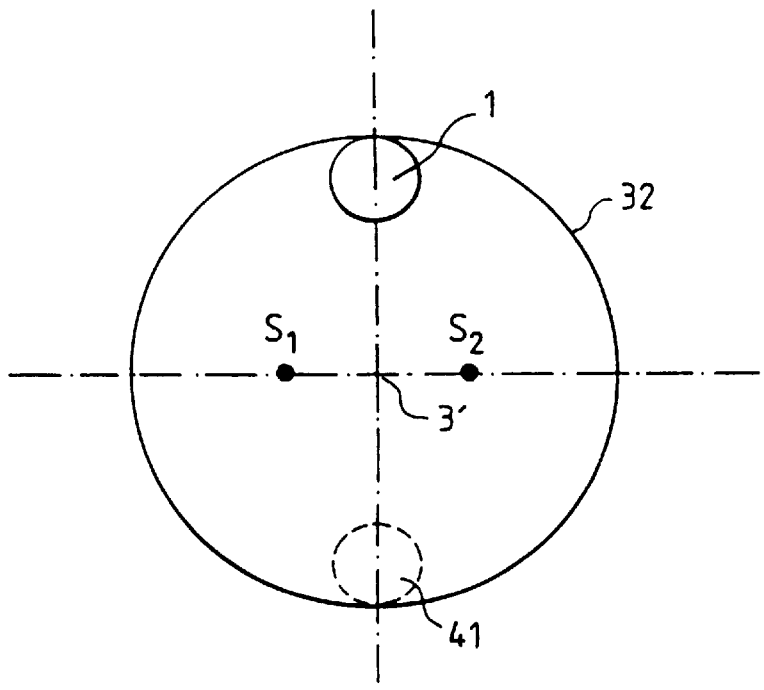

As FIGS. 4 and 5 show, it is possible to use a second transducer 41 positioned for example symmetrically to the first transducer 1 with respect to the center 3' of the antenna. This second transducer 41 is furthermore for example located at a distance from the receiver that differs by λ/8 from the distance 21' between the first transducer 1 and the receiver. The second transducer is for example controlled in the same way and with the same circuits of the first transducer. Referring to FIG. 2, it can be seen then that the implementation of either of the transducers enables the generation of a test signal. The difference in amplitude between this signal and the optimum, located at a point of cancellation or zero point 23 of the mean value of the test signal, will be at most 3 dB. This is sufficient in the case of an auto-test application for example. This has the advantage of not requiring any mechanical setting on mass-produced articles, especially any setting of the position of a transducer with respect to a receiver. The low cost of a transducer makes this approach even more economically valid.

FIGS. 4 and 5 give an exemplary sectional view of a system of FIG. 3. FIG. 4 illustrates the case of a monopulse radar antenna with two elements S1 and S2 where the sum and difference channels are obtained by combinations of microwave signals and where the transducer 1 is placed on a bisector line 42 with respect to two axes, one going through the two elements S1 and S2 and the other being the mean perpendicular of the segment S1S2 of the two elements, as to generate a big signal on the sum and difference channels. In the event of the use of a second transducer 41, this transducer is located symmetrically to the first in relation to the center of the antenna 3'.

FIG. 5 shows an example of a monopulse radar antenna consisting of two elements S1 and S2, where the sum and difference channels are obtained by computation after demodulation. The transducer 1 is placed on the mean perpendicular of the segment S1S2 of the two elements. In this case, since an auto-test is designed for example to compensate for the drifts in the transmission and reception channels associated with S1 and S2, the distance from the transducer 1 to the two elements of the antenna are for example equal so that the test signals have equivalent characteristics. In the event of the use of the second transducer 41, this transducer is located symmetrically to the first one in relation to the center of the antenna 3'.

The transducer 1 and, as the case may be, the second transducer 41 may furthermore be placed in a pack containing the transmission and reception circuits at a place depending on the geometry of the circuit, so as to ensure coupling between the microwave source and the reception circuits. A positioning such as this of a transducer again provides for a compact embodiment.

The transducers used may for example be of the acoustic piezoelectrical type comparable to the one used in many instruments of large-scale consumption such as for example watches, alarm clocks and personal computers. They may be for example used also as miniature loudspeakers with metallized membranes.

The invention applies to frequency shift-keying radars whether they are of a single channel or a multiple pulse type. It can also be applied to a frequency ramp radar. Finally its low cost of manufacture as well as its great compactness, and its ability to make few demands in terms of setting time mean that it is particularly well suited to an application to automobile vehicles.

What is claimed is:

1. An auto-test device for a radar, comprising:
   a receiver;
   at least one transducer located in a field of radiation of a microwave transmission, said transducer being configured to intersect a part of the radiated energy and to send said radiated energy back to the receiver so as to create, in the receiver, a test signal modulated by beats of the transducer; and
   a synchronism mechanism configured to excite the transducer in synchronism with a sub-multiple of a frequency of sampling of a reception signal.

2. A device according to claim 1, wherein the transducer is placed such that the receiver receives a test signal with a mean value close to zero.

3. A device according to claim 2, wherein a distance between said transducer and a source of said microwave transmission is approximately λ/8 where λ is the wavelength of said microwave transmission.

4. A device according to claim 1, further comprising:
   a processor configured to process the test signal using a fast Fourier transform; and
   a post-integration mechanism configured to take an average of the test signals after the processing by fast Fourier transform, the average being taken on a number of recurrences of radar analysis, an auto-test being based on information provided by the post-integration mechanism.

5. A device according to claim 1, wherein the transducer is placed inside an antenna of the radar.

6. A device according to claim 5, wherein the transducer is placed as close as possible to an inner sheathing of a metal cylinder which is open on a side opposite to a radar transmission source.

7. A device according to claim 5 wherein, the antenna being a two-element monopulse radar, the transducer is placed on a line bisecting a first and a second axis, the first axis passing through the two elements, and the second axis being perpendicular to the first axis and passing through a midpoint between the two elements.

8. A device according to claim 5 wherein, the radar being a monopulse radar with two elements, the transducer is placed on a first line perpendicular to a second line passing through the two elements, said first line passing through a midpoint between the two elements.

9. A device according to claim 1, wherein the transducer is placed in a pack containing transmission and reception circuits.

10. A device according to claim 1, comprising a first and a second transducer, the second transducer being placed such that a distance between the second transducer and the receiver differs by a wavelength of the microwave transmission divided by eight from the distance from the first transducer to the receiver.

11. A device according to claim 1, comprising a first and a second transducer, said second transducer being placed symmetrically opposed to the first transducer with respect to the receiver.

12. A device according to claim 1, wherein the transducer is an electroacoustic transducer.

13. A device according to claim 1, wherein the transducer is of the piezoelectrical type.

14. A device according to any of the claims 1 to 11, wherein the transducer is of the electromagnetic type.

* * * * *